Nov. 5, 1963  F. O. LUENBERGER  3,109,315
SHIFT MECHANISM FOR VARIABLE DIAMETER PULLEY STRUCTURES
Filed Oct. 2, 1961
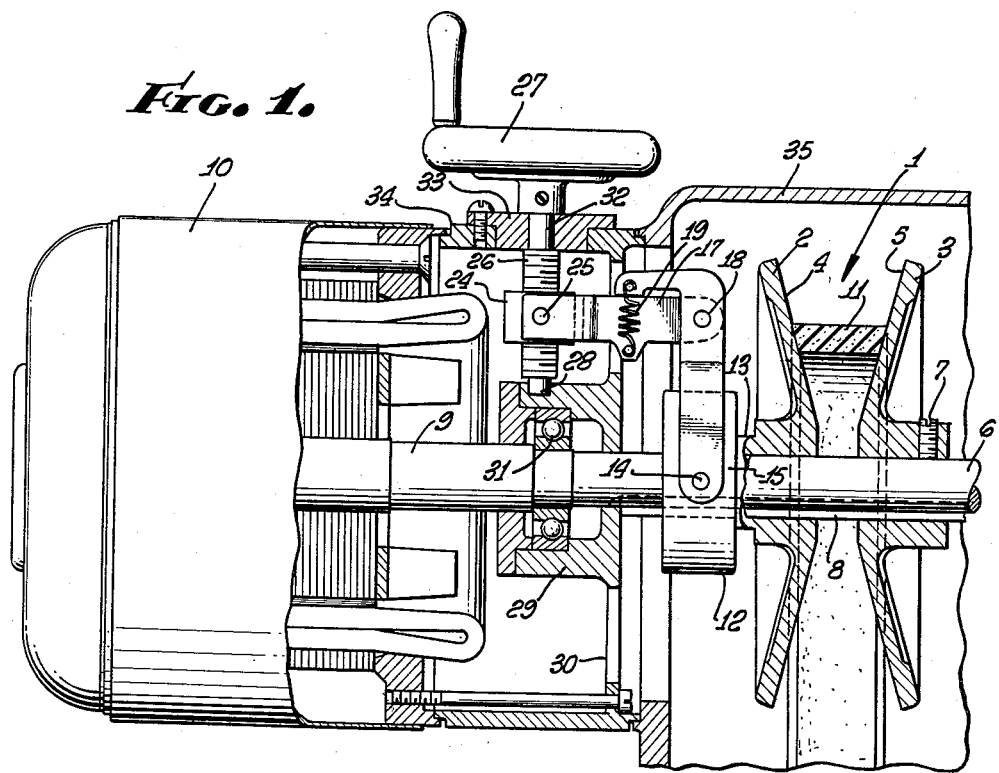
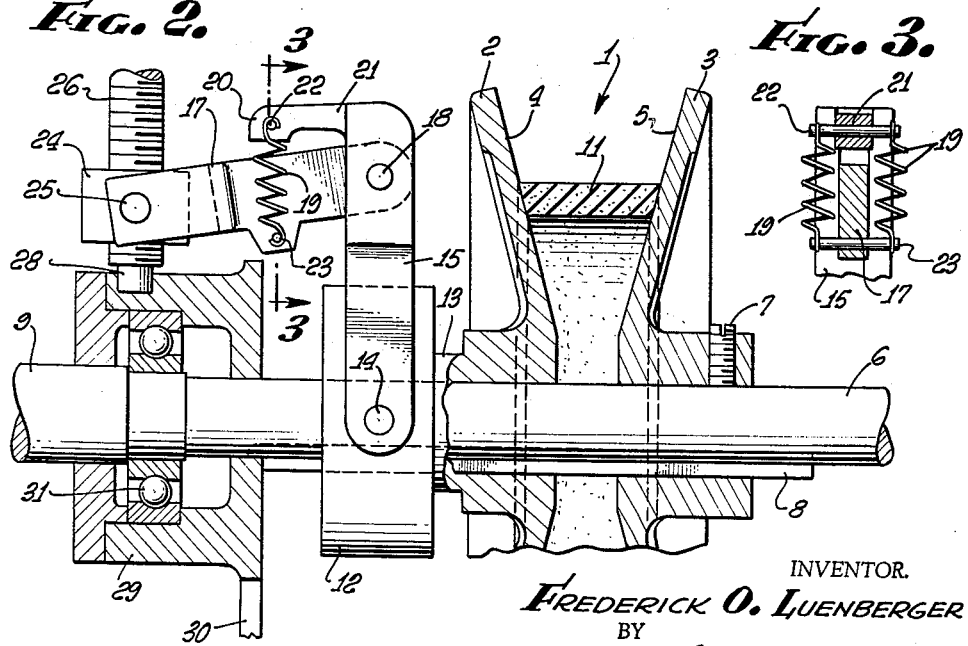
INVENTOR.
FREDERICK O. LUENBERGER
BY
Flam and Flam
ATTORNEYS.

United States Patent Office 3,109,315
Patented Nov. 5, 1963

3,109,315
SHIFT MECHANISM FOR VARIABLE DIAMETER PULLEY STRUCTURES
Frederick O. Luenberger, Los Angeles, Calif., assignor, by mesne assignments, to The Emerson Electric Manufacturing Company, St. Louis, Mo., a corporation of Missouri
Filed Oct. 2, 1961, Ser. No. 142,228
5 Claims. (Cl. 74—230.17)

This invention relates to variable-diameter pulley structures, and particularly to the mode of adjusting such structures.

In such structures, there are provided a pair of pulley sections having opposed inclined faces, mounted on a common shaft. The pulley sections engage respectively the opposite edges of a belt. When the axial spacing of the sections is increased by adjustment, the belt moves radially inwardly to reduce the effective pulley diameter. On the other hand, when the axial spacing is decreased between the inclined faces, the belt is caused to move radially outwardly so as to contact the section faces at a greater distance from the axis; thus the effective diameter of the pulley is increased.

An adjustment for increasing the spacing of the faces can be effected with relatively small force, because the inclined faces are separated from the belt edges as the adjustment takes place; the belt is free to move radially inwardly.

When, however, the pulley faces are moved relatively toward each other, there is a compressive force exerted against the belt edges. If the pulley structure is rotating during adjustment, the belt gradually rides radially outwardly, thereby relieving the pressure. And, of course, if the pulley structure is at stand-still, the belt may move outwardly only if an excessive adjusting force is applied, thereby placing an undesirable stress upon the shifting mechanism. Such undesired stresses may also be encountered even when the structure is rotating, should the adjustment be made at too fast a rate.

It is one of the objects of this invention to ensure against the creation of such excess pressure during adjustment; and particularly, to provide a yielding element in the adjusting or shifting mechanism.

This construction of the shifting mechanism has a further advantage and object. Thus, when the belt load increases, the belt tends to move radially inwardly, exerting a pressure on the adjusting mechanism. By providing a yielding member in this mechanism, the belt is permitted to move inwardly to prevent excessive overload on the pulley structure. As soon as the load returns to normal, the belt can move radially outwardly to assume its former adjusted position.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true to scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a fragmentary view, mainly in longitudinal section, of a shift mechanism shown in use in connection with an electric motor and a variable-diameter pulley structure;

FIG. 2 is an enlarged detailed view of the shift mechanism shown in FIG. 1, but with the parts in a different position; and FIG. 3 is a sectional view, taken along a plane corresponding to line 3—3 of FIG. 2.

In the present instance, the variable-diameter pulley structure 1 includes a pair of sections 2 and 3 and having opposed inclined faces 4 and 5. Pulley section 3 may be mounted in fixed position on a shaft 6 as by the aid of a headless set screw 7. This set screw 7 is accommodated in the hub on the section 3.

Section 3 is in driving relation to the shaft 6 as by aid of a key 8.

The pulley section 2 is axially adjustable along the shaft 6. The shaft 6 forms a continuation of shaft 9 of an electric motor 10, for driving the pulley structure.

The inclined faces 4 and 5 respectively of the pulley sections 2 and 3 are adapted to engage the edge of a driver belt 11. These edges are inclined to correspond to the inclination of the faces 4 and 5. The belt may drive a driven pulley, as described, for example, in Patent No. 2,398,235, issued on April 9, 1946, to F. O. Luenberger.

In this type of variable-diameter pulley, the farther apart the sections 2 and 3 may be, the further the belt 11 may move radially toward the axis of shaft 6. The places of contact of the edges of the belt 11 with the faces 4 and 5 determine the effective diameter of the pulley structure 1.

On the other hand, when the pulley section 2 is moved toward pulley section 3, the belt 11 must ride radially outward of the axis of shaft 6, thereby causing the pulley structure 1 to have an increased effective diameter.

Since this mode of operation of variable pulley structures is now well known, further explanation is considered unnecessary.

In order to adjust the position of section 2 along the shaft 6, use is made of a sleeve or collar 12 which is mounted upon a reduced portion 13 of the hub of section 2. A roller or ball bearing or the like may be interposed between collar 12 and hub 13. The collar 12 therefore can be maintained non-rotary, although the pulley section 2 revolves with the shaft 6.

The collar 12 has a pair of radial pins 14 arranged diametrically opposite to each other. They engage appropriate apertures in the extremities of a forked arm 15.

Pivoted to the arm 15 is another arm 17. This pivotal connection is effected by pin 18, fixed in one of the arms 15 or 17. The arm 17 is urged in a clockwise direction about the pin 18, as viewed in FIG. 1 by a pair of tension springs 19 (FIG. 3). These springs urge the upper surface of the arm 17 into positive contact with the extremity 20 of a projection 21 formed integrally with the arm 15.

Accordingly, if the arm 17 is moved in a clockwise direction about pivot 18, the arm 15 is positively moved thereby for moving the collar 12 toward the left. The arm 15 thus serves as a shifter member.

The springs 19 can be coupled to the extremity 20 of arm 15, as well as to arm 17 by the aid of the pins 22, 23, projecting respectively through the extremity 20 and through the arm 17.

The springs 19 form a resiliently yielding coupling between the arms 15 and 17. These two arms form a link between a nut 24 and a pin 14. Nut 24 engages a lead screw 26. When the nut 24 moves downwardly, the link 17—15 urges collar 12 rightward to increase the effective pulley diameter. Conversely, upward movement of nut 24 causes movement of the collar leftward, to reduce the effective pulley diameter. If there is a sufficiently high resistance to the rightward movement of the collar 22, the springs 19 are elongated, as shown in FIG. 2, without positively urging the sleeve 12 rightward. The initial spring tension on springs 19 is such that the link arms 15 and 17 move as a unit, so long as the resisting pressure does not exceed the initial tension of springs 19.

Thus, for example, if the pulley structure 1 should be at a stand-still, a force urging the pulley section 2 toward the right would be met with resistance due to the contact of the inclined face 4 with the left-hand edge of belt 11. Accordingly, due to the resiliently yielding connection provided by the springs 19, the arm or shifter member 17 can move without adjusting the pulley section 2. As soon as the pulley structure 1 is rotated by energization of the motor 10, the belt 11 can move radially outwardly until the extension 20 contacts the arm 17 in its adjustable position.

The strength of the tension springs 19 can be so adjusted that a definite limit can be placed upon the amount of the force exerted upon the pulley section 2 through arm 15.

Adjustment of arm 17 is effected by the aid of pins 25 carried by nut 24 engaging the slotted engaging apertures in the bifurcated left-hand end of arm 17. This nut is operated by a lead screw 26, carrying a manually manipulatable hand wheel 27.

The lower end of the lead screw 26 has a cylindrical extension 28 journaled in a stationary sleeve 29. This sleeve is formed integrally with end wall 30 of a bracket 34 attached to the casing for the motor 10. Sleeve 29 provides a support for the ball bearing structure 31 for the motor shaft 9.

The upper end of the lead screw 26 has a reduced cylindrical portion 32. This cylindrical portion is journaled in a collar 33 supported upon the bracket 34 of the motor 10.

When the hand wheel 27 is turned so as to move the collar 12 toward the left, the relative spacing of the inclined faces 4 and 5 is increased and the belt 11 can readily move radially inwardly to reduce the effective diameter of the pulley structure. Since there is no material resistance to this leftward movement of the collar 12 and the pulley section 2, the springs 19 maintain the two arms 15 and 17 in contact. However, as heretofore explained, should the pulley structure 1 be at a stand-still, the yielding connection provided by the springs 19 makes it possible to limit the maximum force that can be exerted upon the arm 15 by rotation of the lead screw 26.

When the apparatus is in operation, and should the overload upon the belt 11 become excessive, the belt 11 may be urged strongly inwardly toward the axis of shaft 6. Under such circumstances, the yielding connection provided by the springs 19 permits the collar 12 to be moved leftward although the arm 17 is maintained in an adjusted position. This yielding connection thus limits the load that may be transmitted through the pulley structure 1.

The pulley structure 1 forms one element of a variable ratio transmission having a housing 35. This housing 35 can be appropriately joined to the bracket member 34 of the motor 10.

The inventor claims:

1. In combination: a first pulley section; a second pulley section; a shaft upon which said sections are mounted, at least one of the sections having a hub and being axially adjustable along the shaft; and means for adjusting said one pulley section, comprising: a shifter arm for moving the hub axially; an adjustable arm; a pivotal connection between the arms; and spring means for urging the arms into contact at a place spaced from the pivotal connection, to form a limit to the movement of the first section toward the second section.

2. The combination as set forth in claim 1, in which the arms are separable at said place of contact whenever the shifter arm encounters resistance to its movement to move the first pulley section toward the second section.

3. The combination as set forth in claim 1, with the addition of a lead screw coupled to the free end of the adjustable arm for moving said arm.

4. In combination: a first pulley section; a second pulley section; a shaft upon which said sections are mounted, at least one of the sections having a hub and being axially adjustable along the shaft; and means for adjusting said one pulley section, comprising: a shifter arm for moving the hub axially; an adjustable arm; a pivotal connection between the arms; and spring means for urging the arms into contact at a place spaced from the pivotal connection to form a limit to the movement of the first section toward the second section; said spring means being preset so as to prevent relative movement of the arms until a definite resistance of the pulley section against movement is encountered.

5. In combination: a variable diameter pulley structure having an axially adjustable pulley section, and another pulley section toward and from which the adjustable pulley section may be moved; a shifter arm; means operated by the arm for moving the adjustable pulley section toward the other section; a resilient element coupling said means to the arm; said arm and the means for moving the adjustable section having provisions for positively limiting movement of the adjustable section in a direction toward the other section.

References Cited in the file of this patent

UNITED STATES PATENTS

| 2,573,937 | Turnbull | Nov. 6, 1951 |
| 2,742,794 | Vogelsang | Apr. 24, 1956 |
| 2,923,164 | Walsh | Feb. 2, 1960 |

FOREIGN PATENTS

| 574,631 | Italy | Mar. 24, 1958 |